(12) United States Patent
Kersten

(10) Patent No.: US 8,561,324 B1
(45) Date of Patent: Oct. 22, 2013

(54) COMBINATION LIVESTOCK BEDDING LEVELER AND GROOMER ATTACHMENT

(76) Inventor: Darrick T. Kersten, Marshall, WI (US)

( * ) Notice: Subject to any disclaimer, the term of this patent is extended or adjusted under 35 U.S.C. 154(b) by 254 days.

(21) Appl. No.: 13/251,310

(22) Filed: Oct. 3, 2011

(51) Int. Cl.
*E02F 5/22* (2006.01)
*B08B 9/38* (2006.01)

(52) U.S. Cl.
USPC .............................................. 37/105; 15/93.3

(58) Field of Classification Search
USPC ................ 37/104, 105; 15/93.1, 93.3; 404/96
See application file for complete search history.

(56) References Cited

U.S. PATENT DOCUMENTS

| | | | | |
|---|---|---|---|---|
| 1,594,972 | A | * | 8/1926 | Mautz .............................. 172/26 |
| 2,840,932 | A | * | 7/1958 | Breyer .......................... 172/777 |
| 3,548,956 | A | * | 12/1970 | Hochstetler ................... 172/817 |
| 3,845,516 | A | * | 11/1974 | Abbott et al. .................. 15/93.3 |
| 4,068,726 | A | * | 1/1978 | Heitman ........................ 172/815 |
| 6,843,001 | B2 | * | 1/2005 | Jenne ................................. 37/93 |
| 6,951,253 | B1 | | 10/2005 | Linsmeier |

OTHER PUBLICATIONS

A printout of www.berton.com/skidsteerattachements.php illustrating a circled free stall rake on p. 3 for attachment to a skid steer.
A printout of www.mastfamservice.com/search.asp?cat=1 illustrating a grooming rake for attachment to a skid steer.

\* cited by examiner

*Primary Examiner* — Alicia Torres
(74) *Attorney, Agent, or Firm* — Donald J. Ersler

(57) ABSTRACT

A combination livestock bedding leveler and groomer attachment preferably includes a mounting base, a mechanized equipment mounting plate, a rake arm and a leveler blade. The rake arm is pivotally mounted to one end of the mounting base and the leveler blade is pivotally mounted to the other end of mounting base. The mechanized equipment mounting plate is attached to a rear of the mounting base with any suitable method. The mechanized equipment mounting plate is supplied by numerous manufacturers. The mechanized equipment mounting plate allows the bedding leveler and groomer to be attached to a quick release mounting device retained on a skid steer, construction equipment, farming equipment or any other mechanized equipment. The rake arm includes a plurality of teeth projections for grooming soil or sand. The leveler blade includes a blade member for leveling soil or sand.

17 Claims, 5 Drawing Sheets

COMBINATION LIVESTOCK BEDDING LEVELER AND GROOMER ATTACHMENT

BACKGROUND OF THE INVENTION

1. Field of the Invention

The present invention relates generally to livestock and more specifically to a combination livestock bedding leveler and groomer attachment, which includes a leveler blade for leveling and a rake arm for grooming.

2. Discussion of the Prior Art

U.S. Pat. No. 6,951,253 to Linsmeier discloses an animal bedding groomer.

Accordingly, there is a clearly felt need in the art for a combination livestock bedding leveler and groomer attachment, which levels a bedding area with a leveler blade and grooms the bedding area with a rake arm.

SUMMARY OF THE INVENTION

The present invention provides a combination livestock bedding leveler and groomer attachment, which includes a leveler blade for leveling and a rake arm for grooming. The combination livestock bedding leveler and groomer attachment (bedding leveler and groomer attachment) preferably includes a mounting base, a mechanized equipment mounting plate, a rake arm and a leveler blade. The rake arm is pivotally mounted to one end of the mounting base and the leveler blade is pivotally mounted to the other end of mounting base. The mechanized equipment mounting plate is attached to a rear of the mounting base. The mechanized equipment mounting plate is supplied by numerous manufacturers. The mechanized equipment mounting plate allows the bedding leveler and groomer attachment to be attached to a quick release mounting device retained on skid steers, construction equipment, farming equipment or any other mechanized equipment.

The rake arm preferably includes a elongated rake member, a plurality of teeth projections, a rake base member and two rake pivot arms. A single rake pivot arm extends from one side of the rake base member at each end thereof. The rake pivot arms are pivotally engaged with the one end of the mounting base. One end of the elongated rake member extends from the other side of the rake base member at a middle thereof. The plurality of teeth projections are placed along substantially all of a length of the elongated rake member, starting at the other end thereof. One end of a rake actuation member is pivotally attached at substantially the one end of the elongated rake member and the other end of the rake actuation member is pivotally retained on the mounting base. The rake arm is held in an upright position when not in use by the rake actuation member, and lowered to a horizontal position during use.

The leveler blade preferably includes a leveler frame member and a blade member. The leveler frame member preferably includes a substantially triangular shape. One side of the leveler frame member is pivotally engaged with the other end of the mounting base. The blade member is attached to another side of the leveler frame member. One end of a leveler actuation member is pivotally attached to the leveler frame member and the other end of the leveler actuation member is pivotally attached to the mounting base. The leveler blade is held in an upright position when not in use by the leveler actuation member, and lowered to a horizontal position during use.

Accordingly, it is an object of the present invention to provide a bedding leveler and groomer attachment, which levels and grooms a bedding area with the same device.

These and additional objects, advantages, features and benefits of the present invention will become apparent from the following specification.

DETAILED DESCRIPTION OF THE PREFERRED EMBODIMENTS

Figure 1:
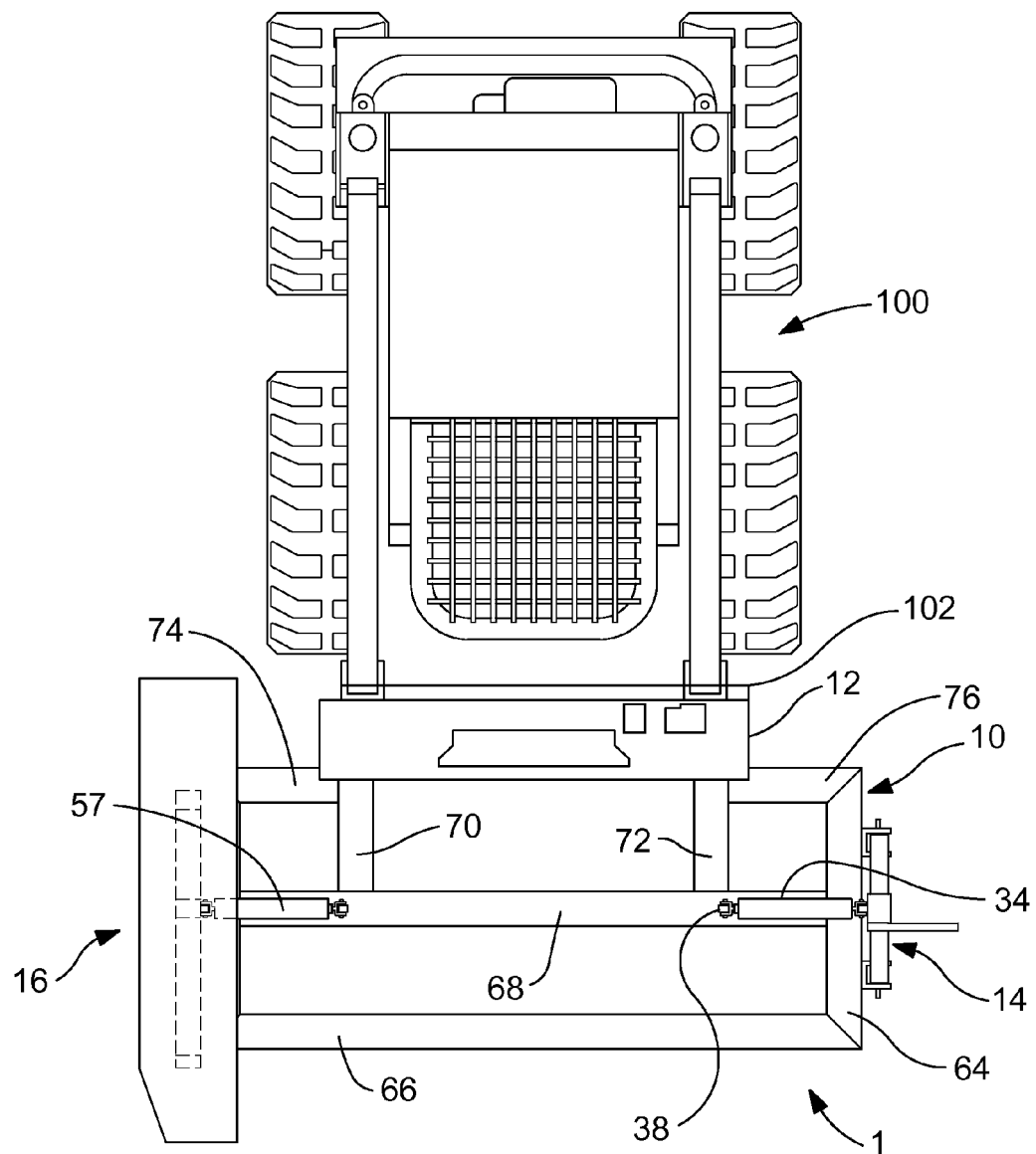
FIG. 1 is a top view of a skid steer with a bedding leveler and groomer attachment retained thereon in accordance with the present invention.
Figure 2:
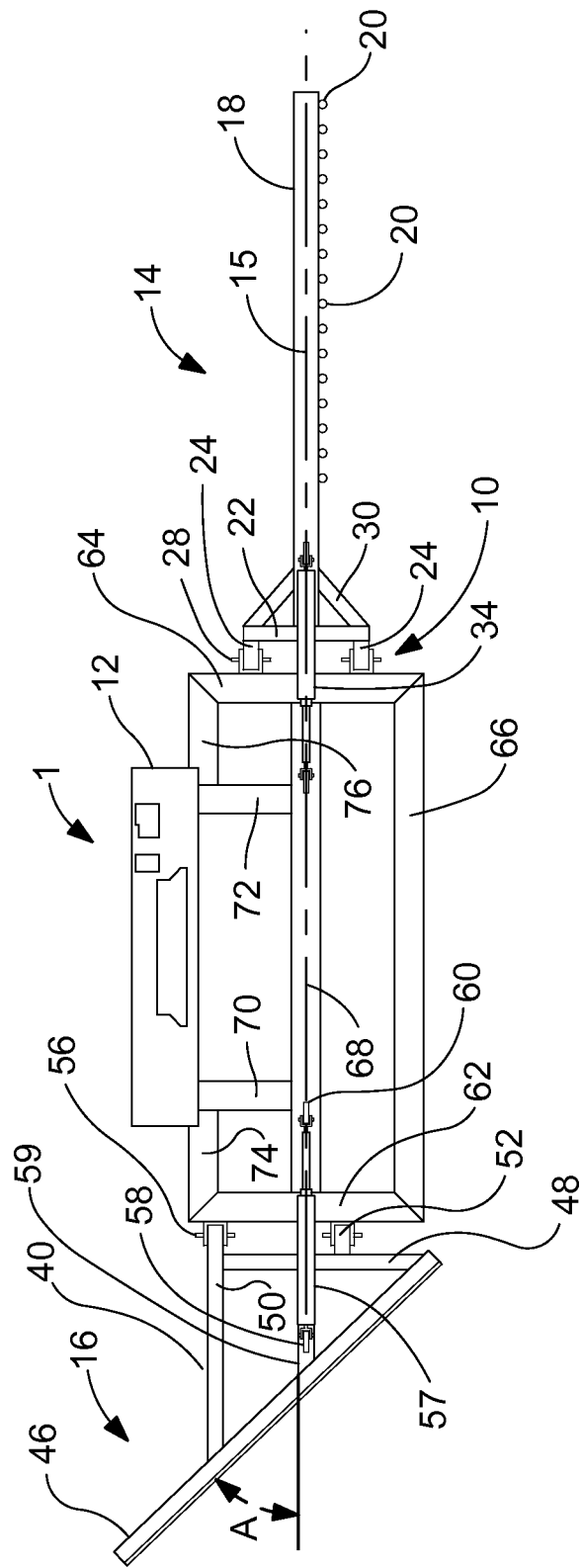
FIG. 2 is a top view of a bedding leveler and groomer attachment in accordance with the present invention.
Figure 3:
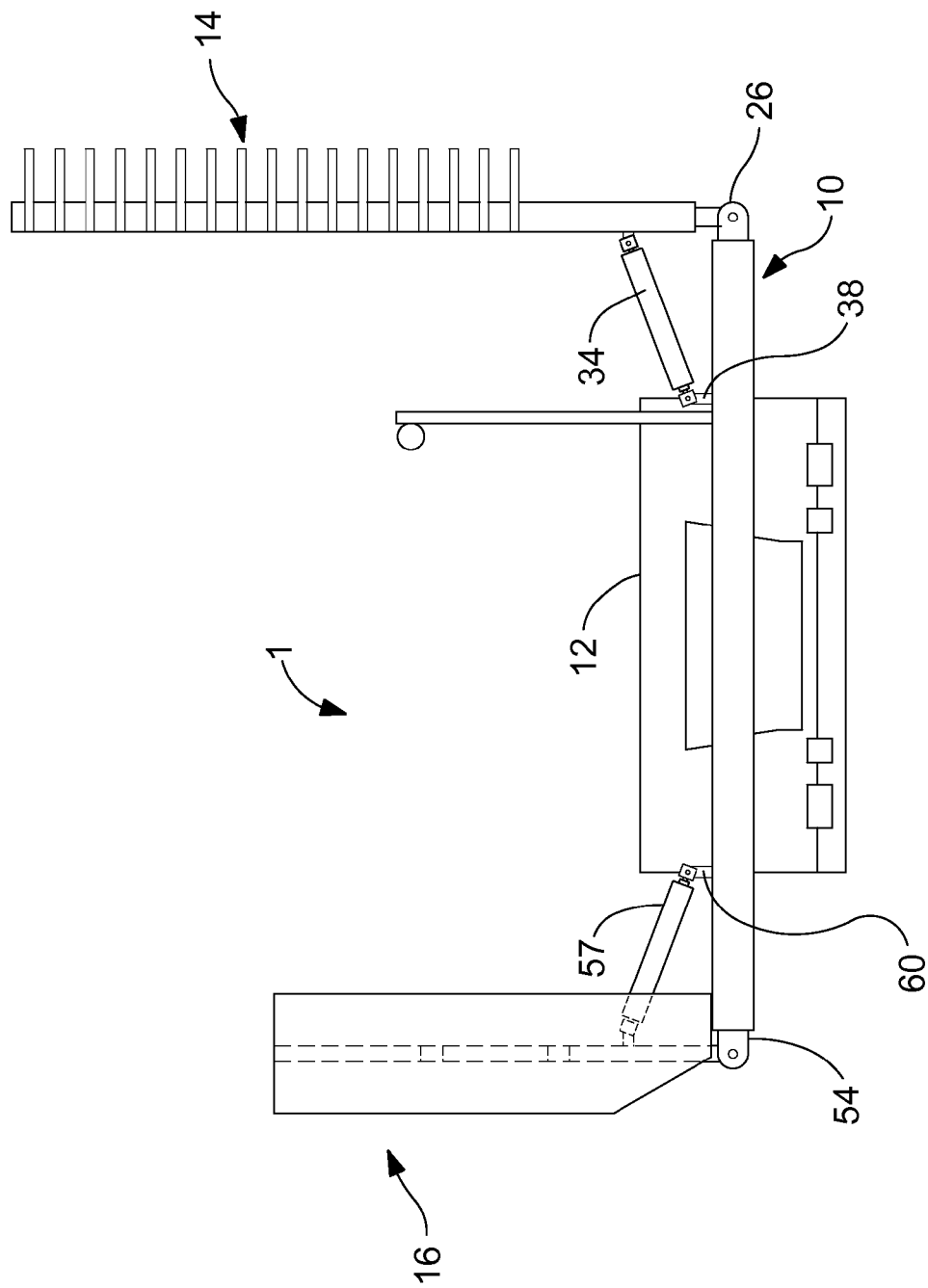
FIG. 3 is a front view of a bedding leveler and groomer attachment with a rake arm and a leveler blade in a retracted position in accordance with the present invention.
Figure 4:
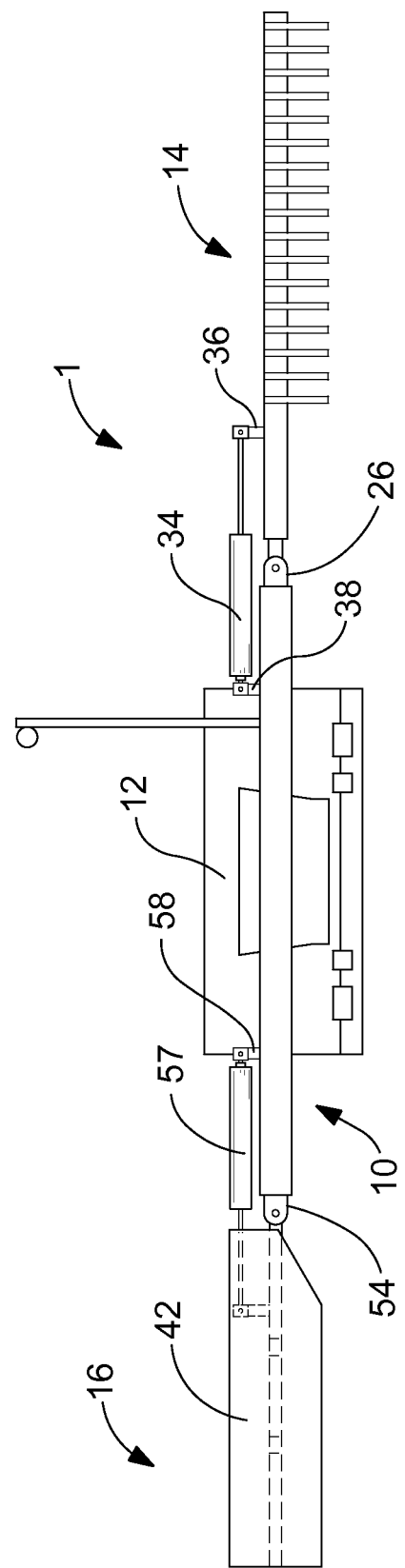
FIG. 4 is a front view of a bedding leveler and groomer attachment with a rake arm and a leveler blade in a use position in accordance with the present invention.
Figure 5:
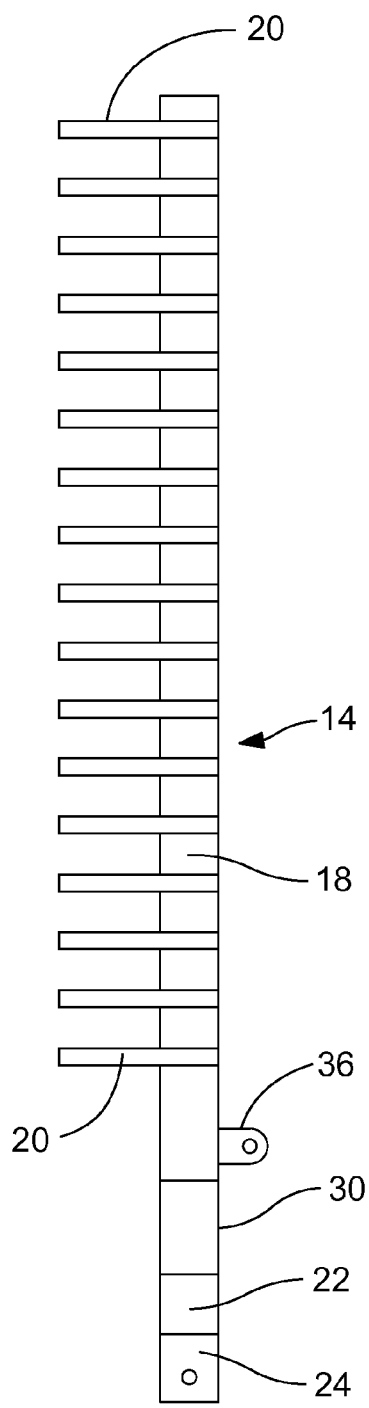
FIG. 5 is an enlarged side view of a rake arm of a bedding leveler and groomer attachment in accordance with the present invention.

With reference now to the drawings, and particularly to FIG. 1, there is shown a top view of a bedding leveler and groomer attachment 1 retained on a skid steer 100. The bedding leveler and groomer attachment 1 preferably includes a mounting base 10, a mechanized equipment 12 mounting plate, a rake arm 14 and a leveler blade 16. The rake arm 14 is pivotally mounted to one end of the mounting base 10 and the leveler blade 16 is pivotally mounted to the other end of mounting base 10. The mechanized equipment mounting plate 12 is attached to a rear of the mounting base 10 with any suitable method, such as welding. The mechanized equipment mounting plate 12 is supplied by numerous manufacturers. The mechanized equipment mounting plate 12 allows the bedding leveler and groomer attachment 1 to be attached to skid steers, construction equipment, farming equipment and any other suitable equipment.

With reference to FIGS. 2-5, the rake arm 14 preferably includes an elongated rake member 18, a plurality of teeth projections 20, a rake base member 22 and two rake pivot arms 24. A single rake pivot arm 24 extends from one side of the rake base member 22 at each end thereof. The two rake pivot yokes 26 extend from the one end of the mounting base 10. The rake arm 14 is pivotally engaged with the mounting base 10 by retaining two rake pivot pins 30 in the two rake pivot arms 24 and the two rake pivot yokes 26. One end of the elongated rake member 18 extends from the other side of the rake base member 22 at a middle thereof.

A pair of side gussets 30 extend from each end of the rake base member 22 and are attached to the elongated rake member 18. The plurality of teeth projections 20 are placed along substantially all of a length of the elongated rake member 18, starting at the other end thereof. One end of a rake actuation member 34 is pivotally engaged with a rake actuator yoke 36 at substantially the one end of the elongated rake member 18 and the other end of the rake actuation member is pivotally engaged with a first actuator yoke 38 on the mounting base 10. The rake arm 14 is held in an upright position when not in use by the rake actuation member 34, and lowered to a horizontal position during use.

Figure 6:
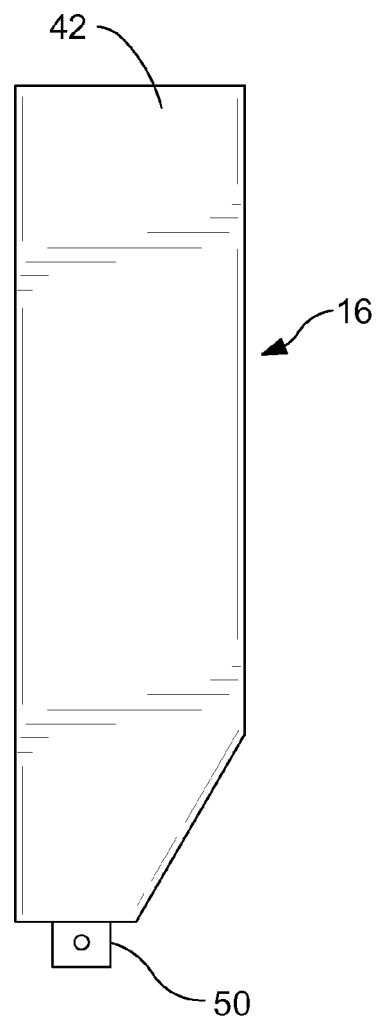
FIG. 6 is an enlarged side view of a leveler blade of a bedding leveler and groomer attachment in accordance with the present invention.

With reference to FIG. 6, the leveler blade 16 preferably includes a leveler frame member 40 and a blade member 42. The leveler frame member 40 preferably includes a blade support member 46, a first base member 48 and a second base member 50. The blade support member 46, the first base member 48 and the second base member 50 are preferably attached to each other with welding or the like to form a substantially triangular shape. The blade support member 46 and the blade member 42 preferably form an acute angle "A" with a lengthwise axis 15 of the mounting base 10 and rake arm 14. The acute angle "A" preferably has a value of between 30%-60%. A blade pivot arm 52 extends from substantially a middle of the first base member 48. Two blade yokes 54 extend from the other end of the mounting base 10. The blade arm 16 is pivotally engaged with the mounting base 10 by retaining two blade pivot pins 56 in the blade pivot arm 52, an end of the second base member 50 and the two blade pivot yokes 54.

The blade member 42 is attached to the blade support member 46 along a length thereof with welding, fasteners or the like. One end of a blade actuation member 57 is pivotally engaged with a blade actuator yoke 58 extending from a blade pivot mount member 59 and the other end of the blade actuation member 57 is pivotally engaged with a second actuator yoke 60 on the mounting base 10. The leveler blade 16 is held in an upright position when not in use by the blade actuation member 57, and lowered to a horizontal position during use. The blade member 42 has a substantially vertical orientation during use. The rake and blade actuation members are preferably hydraulic cylinders, but could be any other suitable actuator.

The mounting base 10 preferably includes a first end member 62, a second end member 64, a first lengthwise member 66 and a second lengthwise member 68. One end of the first end member 62 is attached to one end of the first lengthwise member 66 and one end of the second end member 64 is attached to the other end of the first lengthwise member 66. The second lengthwise member 68 is attached between the first and second end members at substantially the middle thereof. One end of a first attachment member 70 and a second attachment member 72 extend from the second lengthwise member 68. The other end of the first and second attachment members are secured to the mechanized equipment mounting plate 12.

The mechanized equipment mounting plate 12 is retained by a quick release mounting device 102, which is retained on the skid steer 100 or the like. One end of a first support tube 74 is attached to the other end of the first end member 62 and the other end of the first support tube 74 is attached to the first attachment member 70. One end of a second support tube 76 is attached to the other end of the second end member 64 and the other end of the second support tube 76 is attached to the second attachment member 72.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A bedding leveler and groomer attachment comprising:
   a mounting base having a first end, a second end and a rear;
   a mechanized equipment mounting plate is mounted to said rear of said mounting base, said mechanized equipment mounting plate is removably securable to a quick release mounting device of mechanized equipment;
   a rake arm includes an elongated rake member and a plurality of teeth projections, one end of said elongated rake member is pivotally retained on said first end of said mounting base, said plurality of teeth are disposed along a portion of a length of said elongated rake member, means for raising and lowering said rake arm from a substantially horizontal position to an upright position,
   a leveler blade includes a leveler frame member and a blade member, said frame member is pivotally retained on said second end of said mounting base, means for raising and lowering said leveler blade from a substantially horizontal position to an upright position; and
   said one end of said elongated rake member is attached to one side of a rake base member, two rake pivot arms extend from each end of said rake base member on the other side thereof, said two rake pivot arms are pivotally retained on said first end of said mounting base.

2. The bedding leveler and groomer attachment of claim 1, further comprising:
   a pair of side gussets extend from each end of said rake base member and are attached to said elongated rake member.

3. The bedding leveler and groomer attachment of claim 1, further comprising:
   said leveler frame member includes a blade support member, a first base member and a second base member, said blade support member, said first and said second base member are attached to each other to form a substantially triangular shape.

4. The bedding leveler and groomer attachment of claim 3, further comprising:
   a blade pivot arm extends from substantially a middle of said first base member, said blade pivot arm and an end of said second base member are pivotally secured to said second end of said mounting base.

5. The bedding leveler and groomer attachment of claim 1, further comprising:
   said mounting frame includes a first end member, a second end member, a first lengthwise member and a second lengthwise member, one end of said first end member is attached to one end of said first lengthwise member and one end of said second end member is attached to the other end of said first lengthwise member, said second lengthwise member is attached between the first and second end members at substantially a middle thereof.

6. The bedding leveler and groomer attachment of claim 5, further comprising:
   one end of a first attachment member and a second attachment member extend from said second lengthwise member, the other end of said first and second attachment members are secured to said mechanized equipment mounting plate.

7. A bedding leveler and groomer attachment comprising:
   a mounting base having a first end, a second end and a rear;
   a mechanized equipment mounting plate is mounted to said rear of said mounting base, said mechanized equipment mounting plate is removably securable to a quick release mounting device of mechanized equipment;
   a rake arm includes an elongated rake member and a plurality of teeth projections, one end of said elongated rake member is pivotally retained on said first end of said mounting base, said plurality of teeth are disposed along a portion of a length of said elongated rake member, means for raising and lowering said rake arm from a substantially horizontal position to an upright position;
   a leveler blade includes a leveler frame member and a blade member, said blade member forms an acute angle with a lengthwise axis of said mounting base, said frame member is pivotally retained on said second end of said mounting base, means for raising and lower said leveler blade from a substantially horizontal position to an upright position; and said one end of said elongated rake member is attached to one side of a rake base member, two rake pivot arms extend from each end of said rake base member on the other side thereof, said two rake pivot arms are pivotally retained on said first end of said mounting base.

8. The bedding leveler and groomer attachment of claim 7, further comprising:
a pair of side gussets extend from each end of said rake base member and are attached to said elongated rake member.

9. The bedding leveler and groomer attachment of claim 7, further comprising:
said leveler frame member includes a blade support member, a first base member and a second base member, said blade support member, said first and said second base member are attached to each other to form a substantially triangular shape.

10. The bedding leveler and groomer attachment of claim 9, further comprising:
a blade pivot arm extends from substantially a middle of said first base member, said blade pivot arm and an end of said second base member are pivotally secured to said second end of said mounting base.

11. The bedding leveler and groomer attachment of claim 7, further comprising:
said mounting frame includes a first end member, a second end member, a first lengthwise member and a second lengthwise member, one end of said first end member is attached to one end of said first lengthwise member and one end of said second end member is attached to the other end of said first lengthwise member, said second lengthwise member is attached between the first and second end members at substantially a middle thereof.

12. The bedding leveler and groomer attachment of claim 11, further comprising:
one end of a first attachment member and a second attachment member extend from said second lengthwise member, the other end of said first and second attachment members are secured to said mechanized equipment mounting plate.

13. A bedding leveler and groomer attachment comprising:
a mounting base having a first end, a second end and a rear;
a mechanized equipment mounting plate is mounted to said rear of said mounting base, said mechanized equipment mounting plate is removably securable to a quick release mounting device of mechanized equipment;
a rake arm includes an elongated rake member and a plurality of teeth projections, one end of said elongated rake member is pivotally retained on said first end of said mounting base, said plurality of teeth are disposed along a portion of a length of said elongated rake member, means for raising and lowering said rake arm from a substantially horizontal position to an upright position;
a leveler blade includes a leveler frame member and a blade member, said frame member is pivotally retained on said second end of said mounting base, means for raising and lowering said leveler blade from a substantially horizontal position to an upright position; and
said mounting frame includes a first end member, a second end member, a first lengthwise member and a second lengthwise member, one end of said first end member is attached to one end of said first lengthwise member and one end of said second end member is attached to the other end of said first lengthwise member, said second lengthwise member is attached between the first and second end members at substantially a middle thereof.

14. The bedding leveler and groomer attachment of claim 13, further comprising:
a pair of side gussets extend from each end of said rake base member and are attached to said elongated rake member.

15. The bedding leveler and groomer attachment of claim 13, further comprising:
said leveler frame member includes a blade support member, a first base member and a second base member, said blade support member, said first and said second base member are attached to each other to form a substantially triangular shape.

16. The bedding leveler and groomer attachment of claim 15, further comprising:
a blade pivot arm extends from substantially a middle of said first base member, said blade pivot arm and an end of said second base member are pivotally secured to said second end of said mounting base.

17. The bedding leveler and groomer attachment of claim 13, further comprising:
one end of a first attachment member and a second attachment member extend from said second lengthwise member, the other end of said first and second attachment members are secured to said mechanized equipment mounting plate.

\* \* \* \* \*